United States Patent
Sudhan et al.

(10) Patent No.: US 11,489,775 B1
(45) Date of Patent: Nov. 1, 2022

(54) VERTICAL AUTO-SCALING OF A NETWORKING STACK

(71) Applicant: Citrix Systems, Inc., Fort Lauderdale, FL (US)

(72) Inventors: Harihara Sudhan, Bangalore (IN); Mohit Prakash Saxena, Bangalore (IN); Saravanan Jayaraman, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 8 days.

(21) Appl. No.: 17/315,799

(22) Filed: May 10, 2021

(51) Int. Cl.
   *H04L 47/122* (2022.01)
   *H04L 47/2416* (2022.01)
   *H04L 47/10* (2022.01)
   *H04L 47/78* (2022.01)
   *H04L 47/762* (2022.01)

(52) U.S. Cl.
   CPC ........ *H04L 47/122* (2013.01); *H04L 47/2416* (2013.01); *H04L 47/29* (2013.01); *H04L 47/762* (2013.01); *H04L 47/781* (2013.01)

(58) Field of Classification Search
   CPC ... H04L 47/122; H04L 47/2416; H04L 47/29; H04L 47/762; H04L 47/781
   See application file for complete search history.

(56) References Cited

U.S. PATENT DOCUMENTS

| | | | |
|---|---|---|---|
| 2015/0124828 A1* | 5/2015 | Cj ..................... | H04L 12/4633 370/392 |
| 2017/0177407 A1* | 6/2017 | Therien ................ | G06F 9/5094 |
| 2018/0191623 A1* | 7/2018 | Marty ................. | H04L 43/0835 |

* cited by examiner

*Primary Examiner* — Jung H Park
(74) *Attorney, Agent, or Firm* — Foley & Lardner LLP

(57) ABSTRACT

Systems and methods of vertical auto-scaling a networking stack by adjusting the number of packet engines executing on a device are provided. A device intermediary to clients and servers executes first packet engines to process network traffic of a first set of connections. The device determines to adjust the number of packet engines executing on the device based on trigger parameters. The device activates second packet engines to process network traffic for a second set of connections. The device mirrors the network traffic from the first and second set of connections. The first packet engines reject the traffic from the second connections, and the second packet engines reject the traffic from the first connections. The device deactivates the first packet engines when the first connections timeout.

20 Claims, 6 Drawing Sheets

VERTICAL AUTO-SCALING OF A NETWORKING STACK

BACKGROUND

In network environments, a device can route packets between client devices and servers. However, due to the varying volume of network traffic at different times throughout the day, it can be challenging to efficiently process the network traffic without introducing connection drops or latency in the network traffic.

SUMMARY

This technical solution is directed towards systems and methods of vertical auto-scaling of a networking stack. For example, an intermediary device of this technical solution that routes network traffic between clients and servers can provide seamless vertical auto-scaling of a network stack by mirroring network traffic using a raw socket. By mirroring the network traffic, this technical solution can scale up or down the number of packet engines without causing any traffic disruptions, without any loss of traffic, and without any manual intervention in order to effectively utilize the hardware resources of the intermediary device.

At least one aspect is directed to a method of adjusting a number of packet engines executing on a device. The method can include the device executing a first plurality of packet engines to process network traffic between one or more client devices and one or more servers over a first plurality of connections. The method can include the device determining to adjust a number of packet engines executing on the device. The method can include the device activating a second plurality of packet engines on the device to process network traffic of a second plurality of connections different from the first plurality of connections. The device can activate the second plurality of packet engines responsive to the determining to adjust the number of packet engines. The second plurality of packet engines can be different from the first plurality of packet engines. The method can include the device mirroring the network traffic of the first plurality of connections and the network traffic of the second plurality of connections to both the first plurality of packet engines and the second plurality of packet engines. The second plurality of packet engines can be configured to reject processing the network traffic of the first plurality of connections. The first plurality of packet engines can be configured to reject processing the network traffic of the second plurality of packet engines. The method can include the device deactivating the first plurality of packet engines to cause the second plurality of packet engines to process subsequent network traffic received by the device. The device can deactivate the first plurality of packet engines responsive to a timeout of the first plurality of connections.

In implementations, the method can include the device identifying a resource utilization metric associated with the first plurality of packet engines processing the network traffic between over the first plurality of connections. The device can determine to reduce the number of packet engines based on the resource utilization metric being less than a threshold. The device can activate the second plurality of packet engines having fewer packet engines relative to the first plurality of packet engines.

The method can include the device identifying a resource utilization metric associated with the first plurality of packet engines processing the network traffic between over the first plurality of connections. The device can determine to increase the number of packet engines based on the resource utilization metric being greater than or equal to a threshold. The device can activate the second plurality of packet engines having more packet engines relative to the first plurality of packet engines.

The method can include the transferring, by the first plurality of packet engines to the second plurality of packet engines, connection information associated with each of the first plurality of connections. The second plurality of engines can indicate, to the first plurality of packet engines responsive to completion of the transferring, that the second plurality of packet engines have entered a primary mode and the first plurality of packet engines have entered a secondary mode.

The method can include the second plurality of packet engines establishing, responsive to activation, a shared region of memory on the device that is accessible to both the first plurality of packet engines and the second plurality of packet engines. The device can include: i) a first region of memory accessible to the first plurality of packet engines and inaccessible to the second plurality of packet engines, and ii) a second region of memory accessible to the second plurality of packet engines and inaccessible to the first plurality of packet engines.

The method can include the first plurality of packet engines detecting the establishing of the shared region of memory by the second plurality of packet engines. The method can include the first plurality of packet engines providing, to the second plurality of packet engines via the shared region of memory, connection information associated with each of the first plurality of connections. The connection information can include an internet protocol ("IP") address, port information, and idle timeout configuration. The first plurality of packet engines can provide the connection information responsive to detecting that the shared region of memory has been established by the second plurality of packet engines.

The method can include the second plurality of packet engines receiving one or more packets of the network traffic corresponding to the first plurality of connections mirrored by the device. The method can include the second plurality of packet engines determining that the one or more packets correspond to the first plurality of connections. The method can include the second plurality of packet engines rejecting processing of the one or more packets responsive to the determining that the one or more packets correspond to the first plurality of connections.

The method can include the first plurality of packet engines receiving one or more packets of the network traffic corresponding to the second plurality of connections mirrored by the device. The method can include the first plurality of packet engines determining that the one or more packets correspond to the second plurality of connections. The method can include the first plurality of packet engines rejecting processing of the one or more packets responsive to the determining that the one or more packets correspond to the second plurality of connections.

The method can include the second plurality of packet engines receiving connection information corresponding to a connection of the first plurality of connections. The method can include the second plurality of packet engines establishing a temporary connection corresponding to the connection based on the connection information. The method can include the device terminating the connection based on a timeout of the connection. The method can include the device shutting down a packet engine of the first plurality of packet engines that processed network traffic received over the connection. The device can deactivate the first plurality of packet engines responsive to termination of the connection. The second plurality of packet engines can receive an indication of the termination of the connection. The second plurality of packet engines can clear the temporary connection responsive to the indication of the terminating of the connection.

At least one aspect is directed to a system to adjust a number of packet engines that execute on a device. The system can include a device having one or more processors and memory. The device can include a first plurality of packet engines. The first plurality of packet engines can process network traffic between one or more client devices and one or more servers over a first plurality of connections. The device can determine to adjust a number of packet engines that execute on the device. The device can activate, responsive to the determination to adjust the number of packet engines, a second plurality of packet engines on the device to process network traffic of a second plurality of connections different from the first plurality of connections. The second plurality of packet engines are different from the first plurality of packet engines. The device can mirror the network traffic of the first plurality of connections and the network traffic of the second plurality of connections to both the first plurality of packet engines and the second plurality of packet engines. The second plurality of packet engines can reject processing the network traffic of the first plurality of connections. The first plurality of packet engines can reject processing the network traffic of the second plurality of packet engines. The device can deactivate, responsive to a timeout of the first plurality of connections, the first plurality of packet engines to cause the second plurality of packet engines to process subsequent network traffic received by the device.

In implementations, the device can identify a resource utilization metric associated with the first plurality of packet engines processing the network traffic between over the first plurality of connections. The device can determine to reduce the number of packet engines based on the resource utilization metric being less than a threshold. The device can activate the second plurality of packet engines having fewer packet engines relative to the first plurality of packet engines.

The device can identify a resource utilization metric associated with the first plurality of packet engines processing the network traffic between over the first plurality of connections. The device can determine to increase the number of packet engines based on the resource utilization metric being greater than or equal to a threshold. The device can activate the second plurality of packet engines having more packet engines relative to the first plurality of packet engines.

In implementations, the first plurality of packet engines can transfer, to the second plurality of packet engines, connection information associated with each of the first plurality of connections. The second plurality of packet engines can indicate to the first plurality of packet engines, responsive to completion of the transfer, that the second plurality of packet engines have entered a primary mode and the first plurality of packet engines have entered a secondary mode.

The second plurality of packet engines can establish, responsive to activation, a shared region of memory on the device that is accessible to both the first plurality of packet engines and the second plurality of packet engines. The device can include a first region of memory accessible to the first plurality of packet engines and inaccessible to the second plurality of packet engines, and ii) a second region of memory accessible to the second plurality of packet engines and inaccessible to the first plurality of packet engines.

The first plurality of packet engines can detect the establishing of the shared region of memory by the second plurality of packet engines. The first plurality of packet engines can provide, responsive to the detection and to the second plurality of packet engines via the shared region of memory, connection information associated with each of the first plurality of connections. The connection information can include an internet protocol ("IP") address, port information, and idle timeout configuration.

The second plurality of packet engines can receive one or more packets of the network traffic corresponding to the first plurality of connections mirrored by the device. The second plurality of packet engines can determine that the one or more packets correspond to the first plurality of connections. The second plurality of packet engines can reject, responsive to the determining that the one or more packets correspond to the first plurality of connections, processing of the one or more packets.

The first plurality of packet engines can receive one or more packets of the network traffic corresponding to the second plurality of connections mirrored by the device. The first plurality of packet engines can determine that the one or more packets correspond to the second plurality of connections. The first plurality of packet engines can reject, responsive to the determining that the one or more packets correspond to the second plurality of connections, processing of the one or more packets.

In implementations, the second plurality of packet engines can receive connection information corresponding to a connection of the first plurality of connections. The second plurality of packet engines can establish a temporary connection corresponding to the connection based on the connection information. The first plurality of packet engines can terminate the connection based on a timeout of the connection. The device can deactivate, responsive to the termination of the connection, a packet engine of the first plurality of packet engines that processed network traffic received over the connection. The second plurality of packet engines can receive an indication of the terminating of the connection, and clear the temporary connection responsive to the indication of the terminating of the connection.

At least one aspect is directed to a non-transitory computer-readable medium storing instructions that, when executed by one or more processors, cause the one or more processors to adjust a number of packet engines executing on a device. The instructions can include instructions to determine to adjust a number of packet engines processing network traffic between one or more clients and one or more servers. The instructions can include instructions to activate, responsive to the determination to adjust the number of packet engines, a new set of packet engines in addition to a current set of packet engines previously activated to process the network traffic. The new set of packet engines can receive connection information from the current set of packet engines via a shared region of memory to establish temporary connections corresponding to the connection information. The instructions can include instructions to mirror network traffic to both the current set of packet engines and the new set of packet engines to cause the new set of packet engines to reject packets associated with connections established by the current set of packet engines and process packets associated with new connections established by the new set of packet engines. The instructions can include instructions to deactivate, responsive to a timeout of the connections established by the current set of packet engines to result in the new set of packet engines becoming a primary set of packet engines to process network traffic.

The instructions can further include instructions to measure a resource utilization metric associated with the current set of packet engines. The instructions can further include instructions to determine to increase the number of packet engines based on the resource utilization metric. The instructions can further include instructions to activate the new plurality of packet engines having more packet engines than the current set of packet engines.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
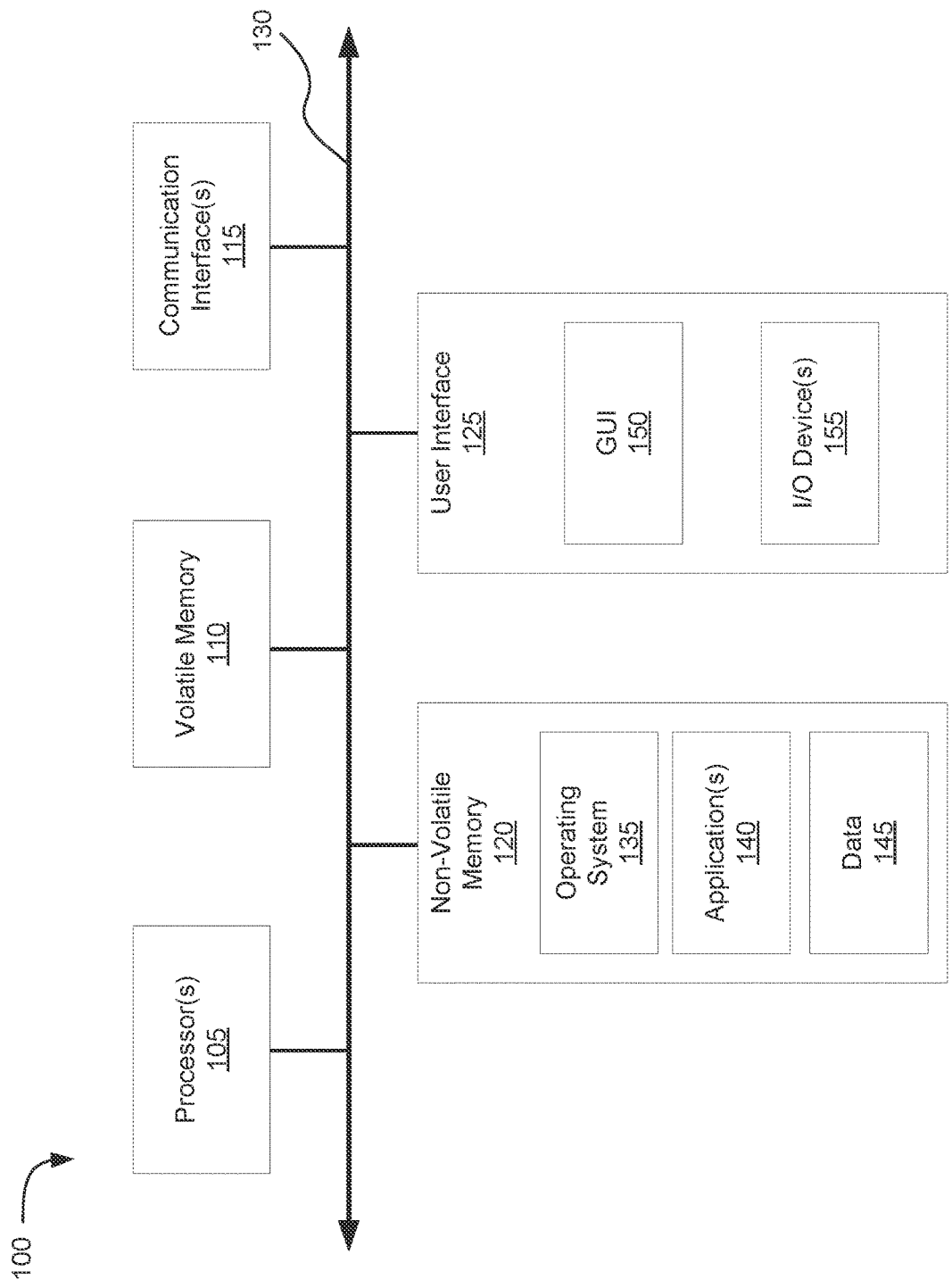
FIG. 1A is a block diagram of embodiments of a computing device.

Systems and methods of vertical auto-scaling of a networking stack are provided. For example, an intermediary device of this technical solution that routes network traffic between clients and servers can provide seamless vertical auto-scaling of a network stack by mirroring network traffic using a raw socket. By mirroring the network traffic, this technical solution can scale up or down the number of packet engines without causing any traffic disruptions, without any loss of traffic, and without any manual intervention in order to effectively utilize the hardware resources of the intermediary device.

A device can be intermediary to client devices and servers. The intermediary device can manage connections between the client devices and the servers, including managing the network traffic between the client devices and the servers. For example, client devices can access a service, resource, or data hosted or provided by the servers through a network. Packet engines on the intermediary device can manage, maintain, or otherwise facilitate the network traffic between client devices and servers. However, depending on the types of resources provided by the servers and access by the client devices, and the number of active connections, the volume of network traffic processes, managed, or maintained by the intermediary device can vary. For example, if the volume of network traffic increases (e.g., amount of data or number of connections), then it may be challenging for the intermediary device to process and route the network traffic without causing latency or delays in the network traffic. Further, the packet engines may operate at or near their full capacity, which can consume more power, increase heat output, and otherwise reduce efficiencies. On the other hand, if the volume of network traffic decreases, then one or more active packet engines may be idle or operating at a low or baseline capacity, which may be unnecessarily consuming power or memory resources.

It can be challenging or not possible to automatically scale the number of packet engines that are active on an intermediary device. For example, modifying the number of active packet engines may require restarting the intermediary device, which can disrupt the existing connections between the clients and the servers result in loss of network traffic or downtime of services provided via the intermediary device.

Thus, systems and methods of this technical solution can provide vertical auto-scaling of packet engines of an intermediary device without any disruption to the existing traffic and without any manual intervention. This technical solution can automatically scale up or down the number of packet engines that are active on the intermediary device based on the available system resources and the load of the intermediary device.

To do so, the intermediary device of this technical solution can detect trigger parameters that indicate a level of performance or resource utilization of the intermediary device. The intermediary device can run a separate monitoring process to trigger the scale-up and scale-down events based on performance information or other user configured trigger parameters. For example, the parameters can indicate the processor or packet engine utilization. The parameter can indicate the processor utilization relative to its capacity. For example, the packet engine or process can be operating at 30%, 50%, 60%, 80% capacity or some other level. Upon detecting that the packet engines are operate above a threshold (e.g., 80% capacity), the system can determine to scale up the number of packet engines by increasing the total number of active packet engines that can process network traffic. However, if the system determines that the capacity level is below a threshold (e.g., 40%), the system can determine to scale down the number of packet engines by decreasing the number of active packet engines.

In the transition period when scaling up or down the number of packet engines, the system can activate or bring up a new set of packet engines (e.g., new packet engines or "N-PE") along with the old or currently active set of packet engines (e.g., old packet engines or "O-PE"). Both the old and new sets of packet engines can operate on the same resources during this transition period.

The process flow for auto-scaling from O-PE to N-PE can include the intermediary device creating different shared memory regions for communication with other processes at startup. The intermediary device can create a new shared memory region for future communication between new packet engines created as part of auto-scale and existing packet engines. Once the shared memory is initialized, the old and new packet engines can use the shared memory region to identify the existence of one another. The existing or old packet engines can use the shared memory region to transfer connection information during the auto-scaling process.

The device can activate the new packet engines and indicate that the new packet engines were activated responsive to an auto-scale trigger. This can indicate to the new packet engines that the old packet engines are still running and serving all the network traffic. Based on this indication, the new packet engines can create the shared memory segments. The new packet engine can also create a new memory region that is segregated from an old memory region that is accessible to the old packet engines.

When the old packet engines detect the existence of the new packet engines via the shared memory region, the old packet engines can transfer connection information to the new packet engines using the shared memory region. The connection information can include an internet protocol ("IP") address, port information, and idle timeout configuration of all the connections. The connection information that is transferred by the old packet engines to the new packet engines can be minimal or less information than exists for the connection. For example, as opposed to providing additional state information or other information associated with the connection, the old packet engines, in implementations, can transfer minimal connection information that includes the IP address, port information, and idle timeout configuration of all the connections maintained by the old packet engines.

The new packet engines can receive the connection information from the old packet engines via the shared memory region. Using the connection information, the new packet engines can create temporary connections with the timeout values. The new packet engines can allocate ports locally for the IP addresses. By allocating local ports for the IP addresses, the new packet engines may not re-use ports across the different packet engines, and can accordingly steer the session to another packet engine.

Once the connection information has been transferred to the new packet engines and the new packet engines have established temporary connections, the new packet engines can update the old packet engines. The new packet engines can provide an indication to the old packet engines that indicates that the new packet engines are becoming the active or primary packet engines for managing network traffic on the device. The old packet engines, responsive to this indication, can stop communicating statistics or other network information to the monitor or an aggregator that receives statistics or parameters.

The device can mirror the same packet traffic to the old and new packet engines using a raw socket interface. For example, all incoming traffic to the intermediary device can be mirrored to the old packet engines and the new packet engines. The old and new packet engines can independently make connection decisions. For example, the old packet engines can stop responding to requests for new connections, while the new packet engines can seamlessly drop old connection data and start responding for new connection requests.

The idle timeout of the connections can be updated on both the old and new packet engines based on the traffic. When a connection times out, the device can free the corresponding port on the respective packet engine. After the connection and port times out, the respective packet engine can deactivate or shut down. The new packet engine can detect that the old packet engine has deactivated or shut down. Responsive to detecting that the old packet engine has deactivated, the new packet engine can free the corresponding allocated ports, thereby allowing the new packet engine to work as an independent entity for all network traffic. Thus, the device can seamlessly scale up or scale down the number of packet engines without disrupting any connection or causing any traffic loss.

For purposes of reading the description of the various embodiments below, the following descriptions of the sections of the specification and their respective contents can be helpful:

Section A describes a computing environment which can be useful for practicing embodiments described herein.

Section B describes systems and methods for vertical auto-scaling a network stack by adjusting the number of packet engines executing on an intermediary device.

A. Computing Environment

Prior to discussing the specifics of embodiments of the systems and methods of managing performance of elements in a multi-hop network topology, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
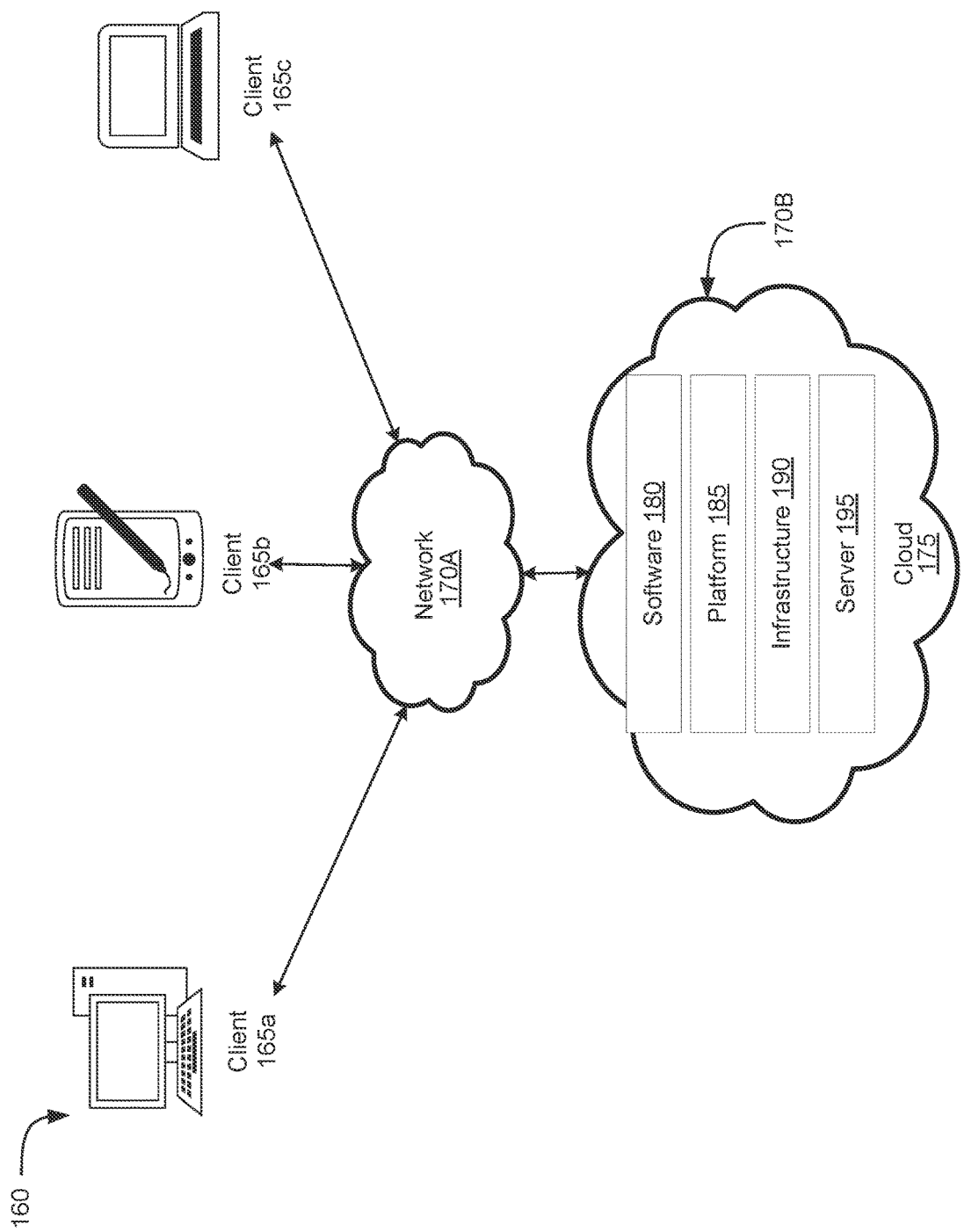
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods for Vertical Auto-Scaling a Network Stack by Adjusting the Number of Packet Engines Executing on an Intermediary Device Systems and methods for vertical auto-scaling a network stack are provided. For example, an intermediary device that manages network traffic and network connections between one or more clients one or more servers can monitor statistics for the packet engines that are managing the network traffic. The device can detect a trigger condition or event based on performance information or other parameters (e.g., time of day, day of the week, etc.). Based on the detected trigger condition, the device can determine to scale up or scale down the number of packet engines that are executing or are active on the device.

However, it can be challenging to scale up or scale down the number of packet engines without causing a disruption to the current connection or traffic loss (e.g., dropped packets), because changing the number of active packet engines can require the device to be restarted. For example, if the device has a 64-core process, then there are 64 available packet engines. But if only 3 packet engines are currently being used, then it may not be possible to activate additional packet engines without restarting the device. Restarting the device can take several minutes and result in one or more services, either provided by the device or by a server via the device to a client device, being unavailable. Further, in a cloud based computing environment, the cores may have not been previously available for managing network traffic because the cores were providing a different service or performing another function on the cloud. Once the cores become available, it may be challenging to activate the cores for traffic management in a seamless manner without disrupting connection or resulting in traffic loss.

Thus, systems and methods of this technical solution can scale up or down the number of packet engines that are actively managing network connection and traffic without having to restart the device, without network traffic loss, and without disrupting network connections, in a seamless manner (e.g., on the order of seconds such as 1 second, 2 seconds, 3 seconds, or within 5 seconds). The system can reduce the amount of time needed to activate the cores by transferring a minimal set of connection from the currently active packet engines to the new packet engines and mirroring the network traffic until the old connections timeout, thereby deactivating the old packet engines.

Figure 2:
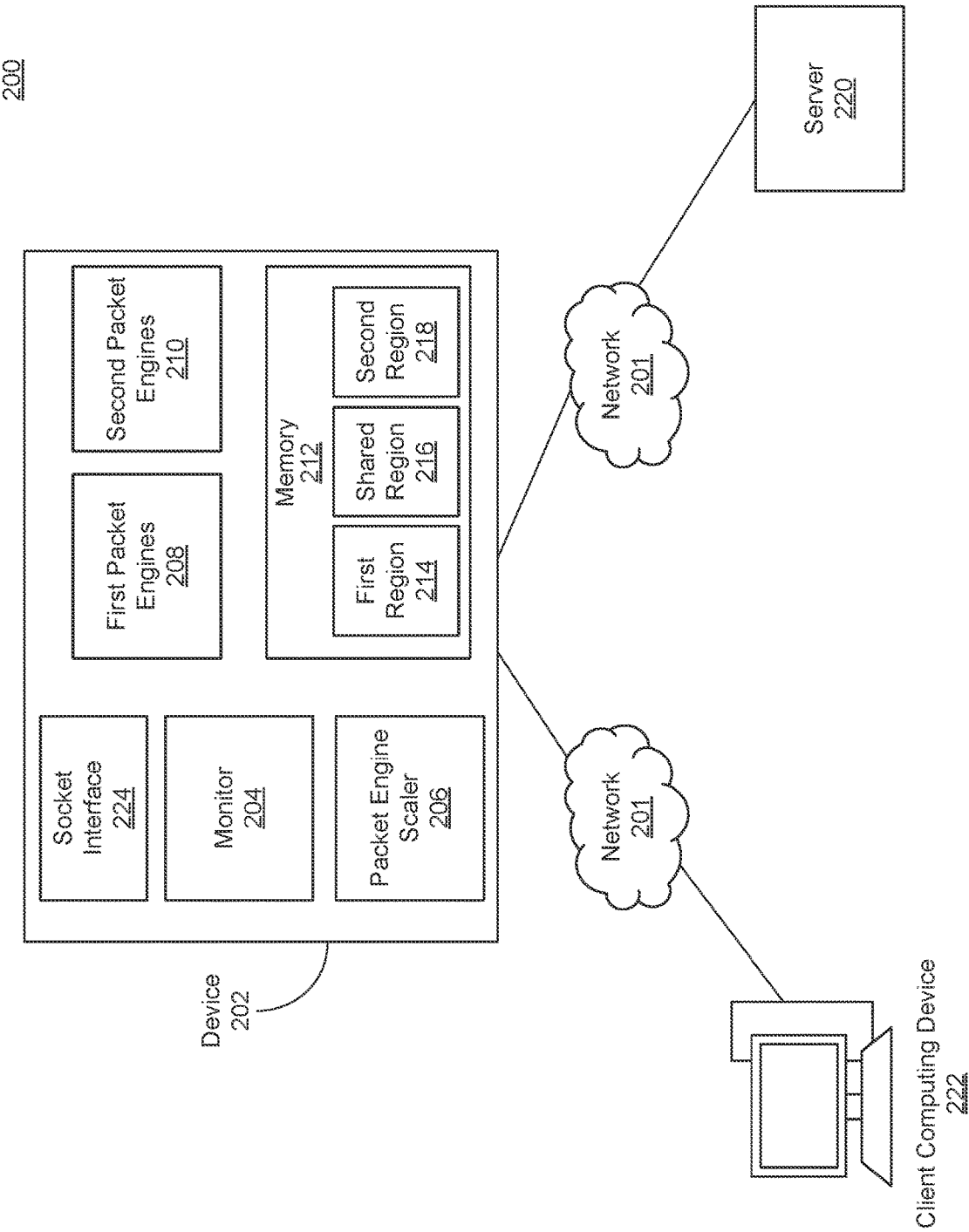
FIG. 2 is a block diagram of a system to adjust a number of packet engines executing on a device, in accordance with an implementation.

Referring to FIG. 2, depicted is a block diagram of a system for adjusting a number of packet engines executing on a device. The system 200 can include a device 202 that can interface or communicate with a client computing device 222 via a network 201 (e.g., network 170 or network 170A, or network 170B). The device 202 refer to or include an intermediary device. The device 202 can include one or more servers, such as servers 195, or be part of the cloud 175. The device 202 can include or be part of a data center. The device 202 can include or be referred to as one or more processors, or one or more servers, or a cloud computing environment. The client computing device 222 can include one or more component or functionality of client device 165*a-c* depicted in FIG. 1B. The device 202 can interface with or communicate with a server 220. The server 220 can refer to or include server 195, or be part of cloud 175. The server 220 can provide resources or services, such as a software-as-a-service application. The server 220 can host applications, documents, or other resources accessed or utilized by the client computing device 222 via the device 202.

The device 202 can include a socket interface 224 that can receive data packets over the network 201. The device 202 can include a monitor 204 that can obtain performance information or statistics associated with the packet engines that are currently active and executing on the device 202. The device 202 can include a packet engine scaler 206 that can receive the statistical information from the monitor 204, detect a trigger event, and proceed with either scaling up or scaling down the number of active packet engines on the device 202 responsive to the trigger event. The device 202 can include first packet engines 208 that manage network traffic between the one or more client devices 222 and the one or more servers 220 associated with the current connections. The first packet engines 208 can refer to current packet engines or old packet engines. The device 202 can include second packet engines 210 that can manage network traffic between the one or more client devices and one or more servers 220 via new connections. The second packet engines 210 can be referred to as new packet engines. The device 202 can include memory 212. The memory 212 can be a non-transitory or non-volatile memory. Non-transitory memory can refer to computer-readable media or machine readable storage medium that can store data for short period or in the presence of power, such as a memory device or random access memory ("RAM"). The memory 212 can be used by the packet engines 208 and 210 to manage network traffic between the one or more client devices 222 and the one or more servers 220. For example, the memory 212 can store connection information associated with the connections. The memory can include a first region 214, a second region 218, and a shared region 216. The first region 214 can be accessible to the first packet engines 208, but not accessible to the second packet engines 210. The second region 218 can be accessible to the second packet engines, but not accessible to the first packet engines 208. And the shared region 216 can be accessible to both the first packet engines 208 and the second packet engines 210 (e.g., used to transfer connection information from the first packet engines 208 to the second packet engines 210).

The monitor 204, packet engine scaler 206, first packet engines 208, and second packet engines 210 can each include at least one processing unit or other logic device such as programmable logic array engine, or module configured to communicate with one or more other system or component depicted in FIG. 2. The monitor 204, packet engine scaler 206, first packet engines 208, and second packet engines 210 can be separate components, a single component, or part of the cloud 175 or server 195. The system 200 and its components can include hardware elements, such as one or more processors, logic devices, or circuits.

The device 202, client computing device 222, or server 220 can include or be implemented using hardware or a combination of software and hardware. For example, components of the device 202, client computing device 222, or server 220 can include logical circuitry (e.g., a central processing unit or CPU) that responses to and processes instructions fetched from a memory unit. Components of the device 202, client computing device 222, or server 220 can include or use a microprocessor or a multi-core processor. A multi-core processor can include two or more processing units on a single computing component. Components of the device 202, client computing device 222, or server 220 can be based on any of these processors, or any other processor capable of operating as described herein. Processors can utilize instruction level parallelism, thread level parallelism, different levels of cache, etc. For example, the device 202, client computing device 222, or server 220 can include at least one logic device such as a computing device or server having at least one processor 105. The components and elements of the device 202, client computing device 222, or server 220 can be separate components or a single component. The device 202, client computing device 222, or server 220 can include a memory component, a random access memory (RAM) or other dynamic storage device, a storage device for storing information, and instructions to be executed. The memory can include at least one read only memory (ROM) or other static storage device coupled with the storage device for storing static information and instructions. The memory can include a storage device, such as a solid state device, magnetic disk or optical disk, to persistently store information and instructions.

The device 202 can be intermediary or between the client computing device 222 and the server 220 in the network topology. The device 202 can be used to authenticate or provide single sign on services to the client device 222. The device 202 can communicate with the client device 222 to provide virtual applications or a virtual desktops or other resources hosted by the server 220.

Still referring to FIG. 2, and in further detail, the system 200 can include, access, communicate with, or otherwise interface with a client computing device 222 that executes or provides a client application. The client computing device 222, via client application, can establish a session or connection with the server 220 via the device 202. The session or connection can refer to a session to access web or SaaS delivered application from the server 220. The client computing device 222 can include one or more client applications, such as a web browser or agent, configured to establish a session with the server 220 via the device 202 to access one or more virtual applications or resources.

The system 200 can include a device 202 designed, constructed and operational to manage network traffic corresponding to session or connections between the client computing device 222 and the server 220. The device 202 can receive requests from the client computing device 222 for a resource or information, and forward the request to the server 220. The server 220 can respond to the request and provide the response to the device 202 for routing back to the client computing device 222. To process the network traffic and manage the connections, the device 202 can use one or more packet engines. For example, the device 202 can include a set of packet engines. The full set of packet engines may not be active at a given time. Instead, the device 202 can activate a subset of packet engines to manage the network traffic at a given time. The subset of packet engines that are currently manage the network traffic between the one or more client devices 222 and the one or more servers 220 can be referred to as first packet engines 208 (or current packet engines or old packet engines). The first packet engines 208 can be the primary packet engines for the device 202, or be in a primary mode, in which the first packet engines 208 are handling all network traffic and all connections of the device 202.

The device 202 can include a monitor 204 designed, constructed and operational to determine resource utilization metrics associated with the first packet engines 208. The monitor 204 can monitor resource utilization metrics associated with a first set of connections. The first set of connections can refer to connections between one or more client devices 222 and one or more servers 220 that are managed by the first packet engines 208. Prior to triggering the auto-scale, the first packet engines 208 can process all network traffic received by the device 202 and manage all connections via the device 202. The first packet engines 208 can use the first region 214 of memory 212 to process the network traffic via the first connections.

The resource utilization metrics can include statistics indicative of a performance, utilization or capacity of the first packet engines 208. The resource utilization metric can refer to a percentage of processor utilization relative to a max utilization value. For example, a current resource utilization metric of the first packet engines 208 can be a percentage such as 5%, 10%, 15%, 20%, 30%, 40%, 50%, 60%, 70%, 80%, 90%, etc. The monitor 204 can determine an average processor utilization across multiple first packet engines 208. For example, the first packet engines 208 can include 2, 3, 4 or more cores of a multi-core processor, and the monitor 204 can determine the process utilization for each of the cores or packet engines, or an average utilization across the active cores or active packet engines.

Additional resource utilization metrics can include, for example, memory utilization per packet engine of the first packet engines 208. In implementations, the monitor 204 can determine connection statistics, such as packet losses, latency, volume, or other network statistics that can be indicative of the performance of the first packet engines 208. In implementations, the monitor 204 can determine an ambient temperature of the first packet engines 208, which can indicate a level of performance or utilization of a packet engine.

The monitor 204 can include a daemon or other background process or task that can monitor the performance associated with the first packet engines 208 or active packet engines 208 on the device. The monitor 204 can access or receive information from one more sensors of the device 202 to determine performance information associated with the first packet engines 208. The monitor 204 can continuously monitor the resource utilization metric, or detect the resource utilization metrics of the first packet engines 208 based on a time interval, such as every 10 seconds, 20 seconds, 30 seconds, 1 minute, 2 minutes, 5 minutes, 10 minutes, or other time interval.

The device 202 can include a packet engine scaler 206 designed, constructed, and operational to detect a trigger condition and adjust the number of active packet engines executing on the device 202 responsive to the trigger condition. The trigger condition can be based on one or more of a resource utilization metric for the first packet engines 208, time of day, day of week, month, number of active connections, amount of memory utilization by the first packet engines 208 (e.g., the amount of memory used in the first region 214 of memory 212), types of connections, volume of network traffic data, types of services being accessed by the client devices 222, or other trigger parameters. In implementations, an administrator of the device 202 can customize the trigger parameters or trigger conditions for the device 202 such that the device 202 can automatically scale up or down the number of packet engines in real-time without manual user interventions.

For example, the packet engine scaler 206 can determine to adjust the number of packet engines based on a comparison of a resource utilization metric corresponding to processor utilization with one or more thresholds. The packet engine scaler 206 can be configured with a first threshold (e.g., a scale down threshold) and a second threshold (e.g., a scale up threshold). If the processor utilization is below the scale down threshold, then the packet engine scaler 206 can determine to scale down the number of active packet engines. If the resource utilization metric is greater than the scale up threshold, then the packet engine scaler 206 can determine to increase the number of active packet engines on the device 202. The scale down threshold can be 40%, 30%, 20%, 10% or other value that facilitates reducing wasted computing resources. The scale up threshold can be 70%, 80%, 90% or other value that facilitates reliable, latency-free network traffic management. Thus, the device 202 can dynamically adjust the number of packet engines to match or balance the process utilization in real-time.

The packet engine scaler 206 can determine to scale up or scale down the number of packet engines based on other trigger parameters. For example, the packet engine scaler 206 can be configured to decrease the number of active packet engines after the workday is over, such as 5 PM or 6 PM. The packet engine scaler 206 can determine to automatically increase the number of packet engines that are active at the start of the work day, such as at 8 AM. The packet engine scaler 206 can generate a historical model of the network traffic to predict when to increase or decrease the number of active packet engines. However, and in some implementations, the packet engine scaler 206, by monitoring the current performance statistics, can scale in real-time to match the current demand.

Upon determining to adjust the number of active packet engines on the device 202, the device 202 can determine to activate second packet engines 210. The packet engine scaler 206 can activate the second packet engines 210 with a number of active packet engines. The number of second packet engines 210 can be greater than or less than the number of first packet engines 208 based on whether the packet engine scaler 206 determines to increase or decrease the number of active packet engines on the device 202. The second packet engines 210 can be referred to as new packet engines, and be different from the first packet engines 208 which can be referred to as the old packet engines. The packet engine scaler 206 can activate the second packet engines 210 to process network traffic for new connections that are different from the connections that are being managed by the first packet engines 208.

For example, the packet engine scaler 206 can identifying a resource utilization metric associated with the first packet engines 208 processing the network traffic between over a first set of connections over network 201 between one or more client computing devices 222 and one or more servers 220. If the resource utilization metric (e.g., processor utilization) is below the scale down threshold (e.g., 30%), then the packet engine scaler 206 can determine to reduce the number of packet engines. To do so, the packet engine scaler 206 an activate second packet engines 210 with a number of packet engines that is less than the number of active first packet engines 208.

The delta or different in the number of packet engines between the first packet engines 208 and the second packet engines 210 can be a fixed number. For example, the packet engine scaler 206 can determine to reduce the number of packet engines by 1 packet engine, 2 packet engines, 3 packet engines, or other number. The packet engine scaler 206 can be configured to reduce the number of packet engines by 1, and subsequently monitor the resource utilization metric to trigger a second reduction or maintain the number of packet engines as is.

If, on the other hand, the resource utilization metric (e.g., processor utilization) is greater than the scale up threshold (e.g., 80%), then the packet engine scaler 206 can determine to increase the number of packet engines. The packet engine scaler 206 active the second packet engines 210 with a number of packet engines that is greater than the number of active first packet engines 208. The increase in the number of packet engines can be a fixed number, such as 1 packet engine, 2 packet engines, 3 packet engines or other increase. For example, the packet engine scaler 206 can be configured to increase the number of packet engines one at a time. Upon increasing the number of packet engines by one, the device 202 can monitor the resource utilization metric and trigger an additional increase if the resource utilization metric again exceeds the scale up threshold.

The second packet engines 210 can establish a second region 218 in memory 212. The second packet engines 210 can establish a second region 218 in memory 212 responsive to being activated. Each of the second packet engines 210 can establish a respective second region 218 in memory 212. The second region 218 in memory can be different from the first region 214 in memory 212 with regard to which packet engines can access the second region 218 in memory. For example, the first region 214 can be segregated from the second region 218 in that the first packet engines 208 can access the first region 214, while being unable to or blocked from accessing the second region 218. The second region 218 can be segregated from the first region 214 in that that the second packet engines 210 can access the second region 218, while being unable to or blocked from accessing the first region 214.

The packet engine scaler 206 can activate the second packet engines 210 with an indication or configuration that indicates to the second packet engines 210 that the second packet engines 210 were activated responsive to a scaling process. This indication can indicate to the second packet engines 210 that the first packet engines 208 are currently still active and handling the current connections between the client devices 222 and the servers 220. This indication can further instruct or cause the second packet engines 210 to generate the shared region 216 in memory 212.

The second packet engines 210 can establish, responsive to being activated by the packet engine scaler 206, the shared region 216 of memory 212. The second packet engines 210 can establish the shared region 216 with permissions or a configuration that allows the first packet engines 208 to detect and access the shared region 216. For example, the second packet engine 210 can provide the first packet engine 208 with read and write access to the shared region 216 of memory 212.

The first packet engines 208 can detect the creation of the shared region 216. The first packet engines 208 can detect or otherwise receive an indication that the shared region 216 has been established by the second packet engines 210. The first packet engines 208 can store information associated with the first connections handled by the first packet engines 208 in the shared region 216. The first packet engines 208 can store the connection information associated with the first connections responsive to detecting the establishment of the shared region 216.

The first packet engine 208 can store some or all the connection information. For example, to reduce the duration of the auto-scale process, the first packet engine 208 can be configured to store minimal connection information in the shared region 216. Storing minimal connection information can reduce memory utilization. Storing minimal connection information can reduce the duration of the write process undertaken by the first packet engines 208 to store the connection information in the shared region 216, while also reducing the duration of the read process undertaken by the second packet engines 210 to obtain the connection information. The minimal connection information for each of the first connections managed by the first packet engines 208 can include, for example, an internet protocol ("IP") address, port information, and idle timeout configuration (or value). By storing the connection information in the shared region 216, the first packet engines can transfer the connection information associated with each of the first connections to the second packet engines 210.

In some cases, the second packet engines 210 can be configured to copy the connection information and store the connection information in the second region 218. In some cases, the second packet engine 210 can read the connection information directly from the shared region 216 during the auto-scale transition process without generating a copy. The second packet engine 210 can provide an indication to the first packet engines 208 that the second packet engines have become the primary packet engines for the device 202. For example, the second packet engines 210 can enter a primary mode responsive to obtaining the connection information from the shared region 216. The first packet engines 208 may have previously been in the primary mode previously as the first packet engines 208 were handling all network traffic via the device 202. The second packet engines 210, upon entering the primary mode, can cause the first packet engines 208 to enter a secondary mode. In the secondary mode, the first packet engines 208 can continue to process network traffic from the first connections, but reject requests to establish new connections. In the primary mode, the second packet engines 210 can accept requests to establish new connections, but reject processing of packets associated with the old first connections previously established and being handled by the first packet engines 208.

Once the second packet engines 210 can read, obtain, retrieve, or other identify the connection information, the second packet engines 210 can establish temporary connections using the connection information. The temporary connections can correspond to the first connection or old connections established and managed by the first packet engines 208. The temporary connections can be deemed temporary in that the first connections are being managed by the first packet engines 208, and the data packets received via the temporary connections by the second packet engines 210 are rejected or not processed by the second packet engines 210. The temporary connections can be established with the same timeout configuration as the first connections, as well as the same port number so as to avoid port reuse. By establishing the temporary connections by the second packet engines 210, the second packet engines can establish new connections responsive to a request for a new connection without inadvertently reusing a port number that is being used by a first packet engine 208 to manage a first connections.

The second packet engines 210, which are now the primary packet engines on the device 202, can create temporary connections with the timeout values received via the shared region 216. The second packet engines can allocate the ports locally for the IP addresses. This can avoid port-reuse across the first and second packet engines, and steer network traffic associated with a first connection to a corresponding one of the first packet engines 208. In implementations, after the second packet engines 210 obtain the connection information from the first packet engines 208, the old packet engines 208 can stop communicating statistics information (e.g., information relating the performance of the first packet engines 208 managing the first connections) to the new monitor 204. For example, since the packet engine scaler 206 has already determined to auto-scale the packet engines based on the resource utilization metric, the performance of the first packet engines 208 during the transition period may no longer be relevant since the packet engine scaler 206 has already triggered the auto-scale event.

The packet engine scaler 206 can enter a transition period in which the number of active packet engines is being adjusted. This transition period can last less than on the order of a few seconds, such as 2 seconds, 3 seconds, 4 seconds, 5 seconds, 6 seconds, 7 seconds or other time period that facilitates a seamless and efficient auto-scaling process. To perform the seamless auto-scaling process during the transition period, the packet engine scaler 206 can provide the network traffic to both the first packet engines 208 and the second packet engines 210. The packet engine scaler 206 can receive the network traffic, such as data packets, from the client computing device 222 and the server 220. The network traffic can include data packets corresponding to the first connections established by the first packet engines 208 prior to the activation of the second packet engines 210. The network traffic can include data packets corresponding to new connections established by the second packet engines.

The device 202 can include a socket interface 224. The socket interface 224 can include or refer to a raw socket interface, such as a raw socket interface provided by a kernel (e.g., a Linux kernel). The device 202 can execute a kernel (e.g., a Linux-based kernel) that can provide a raw socket interface. The kernel can refer to a main component of an operating system that can interface between the hardware of the device 202 and the processes of the device 202. The kernel of the device 202 can communicate between the hardware and processes, and provide a raw socket interface. The device 202, e.g., via the socket interface 224, can mirror the network traffic received by the device 202 to both the first packet engines 208 and the second packet engines 210. The device 202 can mirror the network traffic using the raw socket interface 224. A raw socket can refer to or include a type of socket that allows or provides access to an underlying transport provider. The raw socket can be provided by the IPv4 or IPv6 protocols, for examples. The raw socket can be used to receive raw packets such that packets received at the Ethernet layer can be directly passed to the raw socket. The raw socket can bypass a TCP/IP processing and provide the packet directly to the first packet engines 208 and the second packet engines 210. The raw socket interface can be used to send the same packet with header information to both the first packet engines 208 and the second packet engines 210. By mirroring packets using a raw socket interface, the packets can be un-extracted, in implementations. The first packet engines 208 and the second packet engines 210 can identify or determine each section of the packet, including the header and payload. The raw socket interface be established in a networks socket (e.g., L3 socket) or a data-link socket (e.g., L2 socket). In an L3 socket, the header and payload of the socket can be determined in a network layer. In L2 socket, the header and payload of the packet can be determined in a data link layer. Using the raw socket to mirror packets without extracting or removing the header information can reduce latency, delays, or processor utilization of the device 202.

Thus, the device 202 can mirror the network the network traffic of the old connections established by the old packet engines 208 and the new connections established by the new packet engines 210 to both of the first packet engines 208 and the second packet engines 210. The first packet engines 208 can be configured or instructed to reject or not process the data packets corresponding to the second or new connections, and the second packet engines 210 can be configured to reject or not process the packets corresponding to the old connections.

The first packet engines 208 can determine whether a data packet corresponds to a first connection established by the first packet engine 208, or a new connections not established by the first packet engine 208. For example, the first packet engines 208 can compare information in the header of the data packet with the connection information shared with the second packet engines 210 via the shared region 216 to determine whether the packet was previously established by the first packet engines 208. The first packet engine 208 can compare one or more of the IP address of the data packet, port information, timeout value, or other information of the packet with the connection information to determine whether the packet corresponds to an old connection or a new connection. If the IP address of the packet and port information of the packet match the connection information saved by the first packet engine 208, then the first packet engine 208 can determine that the packet corresponds to an old connection and should be processed by the first packet engine 208. Similarly, the second packet engines 210 can compare the packet information with the connection information received from the first packet engines 208 via the shared region 216 to determine that the packet corresponds to a connection previously established by the first packet engines 208. The second packet engine 210, responsive to determining that the packet corresponds to an old connection, can determine to not process the packet.

Thus, the first packet engines 208 and the second packet engines 210 can independently decide whether or not to process a packet based on whether the packet corresponds to an old connection or new connection. The first packet engines 208 and the second packet engines 210 can independently receive all network traffic received by the device 202 and determine whether or not to process the network traffic. As the connections maintained by the first packet engines 208 eventually timeout based on the timeout configuration of the data packets corresponding to the first connections, and as the first packet engines 208 reject packets corresponding to new connections and do not establish any new connections, the first packet engines 208 will eventually no longer have any active connections. When all of the connections managed by the first packet engines 208 timeout, terminate, or seamlessly end, the first packet engines 208 can seamlessly deactivate or shutdown.

As the first packet engines 208 deactivate, the second packet engines 210 can receive an indication that the first packet engines 208 have deactivated. The second packet engines 210 can receive the indication from the first packet engine 208 via the shared region 216, for example. In some cases, the second packet engines 210 can receive the indication from the packet engine scaler 206. In some cases, the second packet engines 210 can determine the first packet engine 208 has deactivated based on the timeout value being satisfied. The second packet engines 210 can clear the temporary connection responsive to the indication of the terminating of the connection. Thus, as each old connection times out or ends, the corresponding connection information can be scrubbed, deleted, or otherwise removed from memory 212 (e.g., from the shared region 216, first region 214, or second region 218). The device 202 can further free the corresponding ports when the timeout of the connections occurs. The second packet engines 210 can also clear, scrub, or otherwise end the temporary connections. For example, the second packet engines 210 can detect when the first packet engine 208 shuts down or deactivates, and then flush the temporary connections the second packet engine 210 created, thereby freeing the allocated ports. The second packet engines 210 can henceforth operate as the primary or independent entity for all incoming network traffic. Deactivating the first packet engines 208 responsive to a timeout of the first connections can, therefore, cause the second packet engines 210 to process subsequent network traffic received by the device 202.

Figure 3:
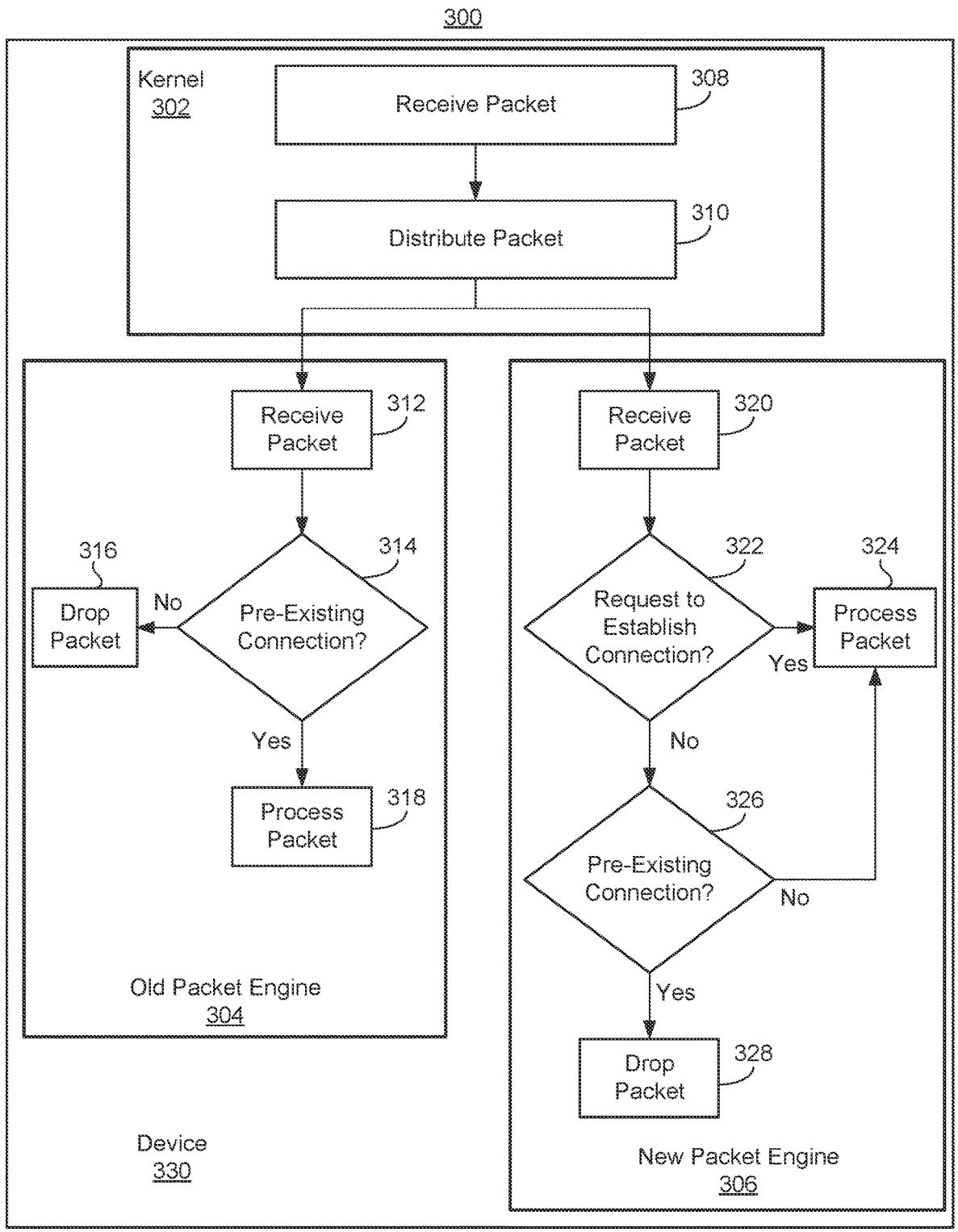
FIG. 3 depicts an example flow diagram illustrating the operation of a system that adjusts a number of packet engines on a device, in accordance with an implementation.

FIG. 3 depicts an example flow diagram illustrating the operation of a system that adjusts a number of packet engines on a device, in accordance with an implementation. The operational flow 300 can be performed by one or more component or system depicted in FIG. 1A, 1B or 2. The operational flow 300 can be performed by a device 330. The device 330 can be intermediary to one or more clients and one or more severs. The device 330 can include a kernel 302, such as a Linux kernel 302 that can provide a raw socket interface. The device 330 can include old packet engines 304 and new packet engines 306. The device 330 can include one or more component or functionality of device 202 depicted in FIG. 2. The old packet engine 304 can include one or more component or functionality of first packet engines 208 depicted in FIG. 2. The new packet engine 306 can include one or more component or functionality of second packet engines 210 depicted in FIG. 2. The kernel 302 can provide a raw socket interface, such as socket interface 224 depicted in FIG. 2.

The old packet engines 304 can refer to packet engines that were active prior to the device 202 triggering a vertical auto-scaling event of the network stack. The old packet engines 304 can refer to packet engines that are the primary or active packet engines prior to the device 330 determining to adjust the number of active packet engines on the device 330. New packet engines 306 can refer to the packet engines that were activated responsive to triggering of the auto-scale event. The new packet engines 306 can refer to the packet engines that are going to supersede or replace the old packet engines 304 as the new primary packet engines 306.

At 308, the kernel 302 can receive a packet. The kernel 302 can receive the packet from a network. The kernel 302 can receive the packet from a client device or a server. The packet can include a header and a payload. At 310, the kernel 302 can distribute the packet to old packet engine 304 and new packet engine 306. The kernel 302, using a raw socket interface, can mirror the packet to both the old packet engine 304 and the new packet engine 306. The kernel 302 can determine to mirror the packet pursuant to an auto-scaling operation to vertically auto-scale the network stack of the device. The network stack can include packet engines handling or processing data packets transmitted and received between client devices and servers.

At 312, the old packet engine 304 can receive the data packet distributed or mirrored by the kernel 302. At 320, the new packet engine 306 can also receive the packet distributed or mirrored by the kernel 302. At 314, the old packet engine 304 can determine whether the packet corresponds to a pre-existing connection. A pre-existing connection can refer to a connection established by the old packet engine 304 prior to activation of the new packet engines 306. A pre-existing connection can refer to a connection between a client device and a server via the device 330 that is being managed by the old packet engine 304. The old packet engine 304 can determine whether the packet corresponds to a pre-existing connection based on one or more of an IP address associated with the packet, port number, timeout configuration, etc.

If, at 314, the old packet engine 304 determines the packet corresponds to a pre-existing connection, the old packet engine 304 can proceed to 318 to process the packet. Processing the packet can refer to or include routing the packet to a corresponding client device or server, for example. If, however, at 314 the old packet engine 304 determines that the packet does not correspond to a pre-existing connection that was established by the old packet engine 304, then the old packet engine 304 can proceed to 316 and drop the packet. Dropping the packet can refer to or include not processing the packet or rejecting processing of the packet.

The new packet engine 306 can receive the same packet at 320 and determine, at 322, whether the packet corresponds to a request to establish a connection. The new packet engine 306 can determine whether the packet corresponds to a request to establish a connection based on header information or payload information of the packet. For example, the packet can include a request to establish a connection. If, at 322, the new packet engine 306 determines that the packet corresponds to a request to establish a new connection, the new packet engine 306 can proceed to 324 to process the packet and establish the new connection. Thus, the new packet engine 306 can process the packet and establish the new connection instead of the old packet engine 304.

If, at 322, the new packet engine 306 determines that the packet does not include a request to establish a new connection, the new packet engine 306 can proceed to 326 to determine whether the packet corresponds to a pre-existing connection. The new packet engine 306 can determine whether the packet corresponds to a pre-existing connection established by the old packet engine 304, similar to 314. For example, the new packet engine 306 can compare header information of the packet with connection information received from the old packet engine 304 regarding the pre-existing connections to determine whether the packet does corresponds to a pre-existing connection.

If the new packet engine 306 determines that the packet corresponds to a pre-existing connection at 326, the new packet engine 306 can proceed to 328 to drop the packet. Dropping the packet can refer to or include rejecting the packet or otherwise not processing the packet. If, however, the new packet engine 306 determines that the packet does not correspond to a pre-existing connection at 326, the new packet engine 306 can proceed to 324 to process the packet, which can correspond to a new connection that was established by the new packet engine 306 responsive to a request to establish a connection.

Figure 4:
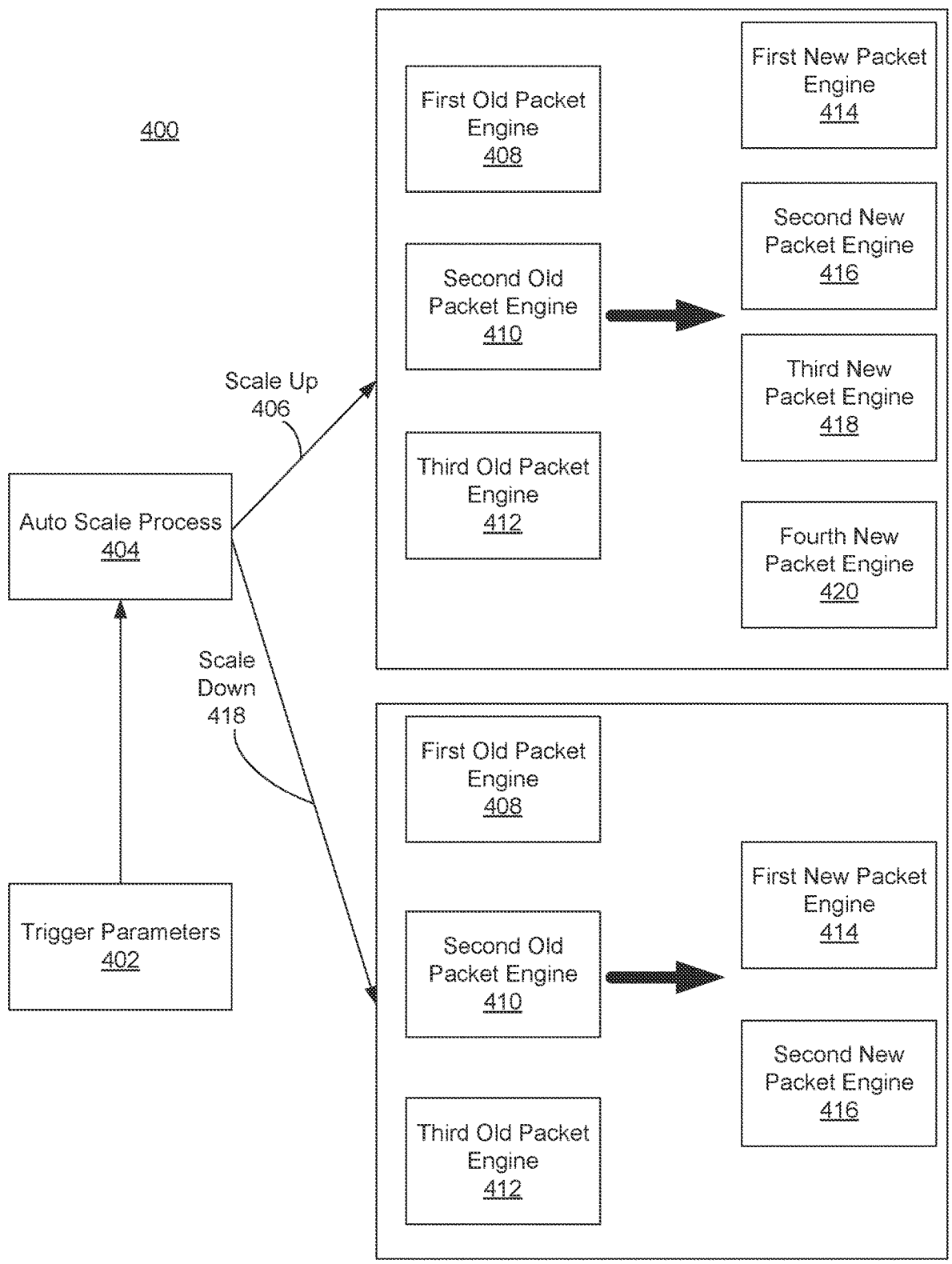
FIG. 4 depicts an example flow diagram illustrating the operation of a system that adjusts a number of packet engines on a device, in accordance with an implementation.

FIG. 4 depicts an example flow diagram illustrating the operation of a system that adjusts a number of packet engines on a device, in accordance with an implementation. The operation 400 can be performed by one or more component or system depicted in FIG. 1A, 1B, 2, or 3. The operation 400 can be performed by a device that is intermediary to one or more clients and one or more servers. The device can include one or more old packet engines (e.g., 408, 410, or 412). The device can scale to one or more new packet engines (e.g., 414, 416, 418, or 420). The first old packet engine 408, the second old packet engine 410, and the third old packet engine 412 can include one or more component or functionality of first packet engines 208 depicted in FIG. 2, or old packet engine 304 depicted in FIG. 3. The first new packet engine 414, second new packet engine 416, third new packet engine 418, or fourth new packet engine 420 can include one or more component or functionality of second packet engines 210 depicted in FIG. 2, or new packet engine 306 depicted in FIG. 3.

At 402, the device can detect, measure, or otherwise identify trigger parameters. Trigger parameters can refer to information that can trigger an auto-scale process. Trigger parameters can be predetermined or set by an administrator of the device. Trigger parameters can be based on a resource utilization metric associated with one or more of the first old packet engine 408, second old packet engine 410 or third old packet engine 412. The trigger parameters can indicate a CPU usage, memory usage, a duration the packet engines have been active, time of day, number of connections, number of connections that have been established over a time interval, etc. The device can receive measurements or data for the trigger parameters in real-time, or based on a time interval (e.g., every 1 minute, 2 minutes, 3 minutes, 3 minutes, 5 minutes, 10 minutes, 15 minutes or other time interval that facilitates auto-scaling).

At 404, the device can determine whether to auto scale or adjust the number of packet engines that are active on the device. The device can receive the trigger parameters and compare the trigger parameters with a threshold or otherwise determine a trigger condition or event based on the trigger parameters. For example, the device can include three active packet engines, a first old packet engine 408, a second old packet engine 410, and a third old packet engine 412. The device can determine that the CPU utilization for one, two or all three of the first old packet engine 408, second old packet engine 410, or third old packet engine 412 is greater than a threshold (e.g., 80%) for a time interval (e.g., 10 minutes). Based on this determination, the device can determine to trigger a scale up process 406 to increase the number of active packet engines. The device can increase the number of packet engines by a predetermined amount, such as one packet engine. For example, the device can activate four new packet engines, which is one more than the number of old packet engines that were active on the device. The four new packet engines are first new packet engine 414, second new packet engine 416, third new packet engine 418, and fourth new packet engine 420. The three old packet engines are first old packet engine 408, second old packet engine 410, and third old packet engine 412. The device can seamlessly scale up by providing the new packet engines with information about the pre-existing connections, mirroring the network traffic received by the device to the new and old packet engines, and configuring the new packet engines to establish new connections while rejecting packets associated with the pre-existing connections. As the pre-existing connections timeout, the old packet engines can deactivate or shutdown, resulting in the new packet engines processing all network traffic received by the device.

If, however, the CPU utilization associated with the old packet engines 408, 410 and 412 is below a threshold (e.g., 30%) for the time interval, the device can determine to trigger a scale down process 418. During the scale down process 418, the device can activate fewer new packet engines relative to the number of old packet engines that were previously active. For example, if there were three old packet engines that were active, during the scale down process 418, the device can activate two new packet engines: first new packet engine 414 and second new packet engine 416. The device can seamlessly scale down in a similar manner to scaling up by providing the new packet engines with information about the pre-existing connections, mirroring the network traffic received by the device to the new and old packet engines, and configuring the new packet engines to establish new connections while rejecting packets associated with the pre-existing connections. As the pre-existing connections timeout, the old packet engines can deactivate or shutdown, resulting in the new packet engines processing all network traffic received by the device.

Figure 5:
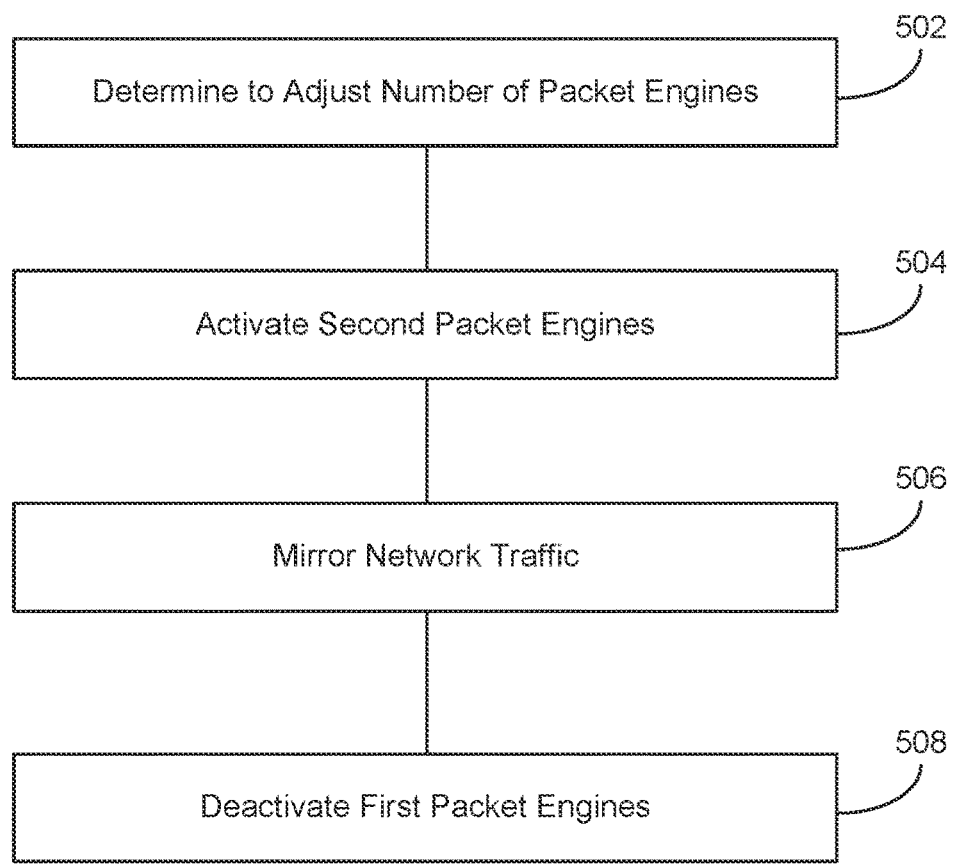
FIG. 5 depicts an example method for adjusting a number of packet engines executing on a device, in accordance with an implementation.

FIG. 5 depicts an example method for adjusting a number of packet engines executing on a device, in accordance with an implementation. The process 500 can be performed by one or more component or system depicted in FIG. 1A, 1B, 2, 3, or 4, including, for example, a device intermediary to one or more clients and one or more servers, a socket interface, a monitor, a packet engine scaler, first packet engines, second packet engines, and memory. At 502, the device can determine to adjust the number of packet engines. The device can determine to adjust the number of packet engines responsive to a trigger condition or trigger events based on trigger parameters. The device can determine to increase or decrease the number of active packet engines on the device to better match or correspond to the network traffic load processed by the device during a time interval. The network traffic can correspond to data packets transmitted and received by the one or more client devices or one or more servers via a network.

At 504, the device can determine to activate second packet engines. Second packet engines can refer to new packet engines that were not previously active. For example, the device can include multiple processors or a processor with multiple cores (e.g., a 64-core processor architecture). Each core can refer to, include, or execute a packet engine. Each packet engine can process network traffic corresponding to a connection between a client device or a server.

Upon activation of the new packet engines, the old packet engines can provide information about the pre-existing connections to the new packet engines. Since the old packet engines are configured to still process or handle the pre-existing conditions and the new packet engines are configured to reject or not process packets associated with the pre-existing connections, the old packet engines can transfer or provide minimal connection information to the new packet engines. The minimal connection information can include an IP address, port information, and the idle timeout configuration of all the pre-existing connections. The old or current packet engines can provide the connection information via a shared region of memory on the device that both the old and new packet engines can access. Transferring all the connection information, as opposed to this minimal or subset of connection information, can be inefficient or wasteful, and result in latency, delays, or a deadlock in processing network traffic of the pre-existing connections. Thus, transferring the minimal connection information can reduce inefficiencies and mitigate or prevent delays, or network traffic loss.

At 506, the device can distribute or mirror the network traffic received by the device to both the first packet engines (e.g., the old packet engines or current packet engines) and the second packet engines (e.g., the new packet engines that were activated or brought online responsive to the auto-scale trigger). The device can use a raw socket interface provided by a kernel of an operating system installed and executing on the device to mirror or distribute the packets in an efficient manner to both the old and new packet engines.

The old and new packet engines, upon receiving a packet, can determine whether the packet information matches or corresponds to a pre-existing connection. If the packet corresponds to a pre-existing connection, then the old packet engine can process the packet, while the new packet engines can reject or not process the packet.

The pre-existing connection can end. The connection can end based on the client device or server ending the connection. The connection can end based on a timeout value. For example, the connection can end if the connection remains idle for an idle timeout value. At 508, when a pre-existing connection ends or times out, the corresponding old packet engine can deactivate or shut down since the packet engine may no longer be processing network traffic. When an old packet engine deactivates, the device can clear the corresponding connection information since it may no longer be used by the device. Thus, the device can seamlessly scale or adjust the number of packet engines without negatively impacting any existing sessions between a client device and a server through one or more connections managed by the device.

The above-mentioned elements or entities may be implemented in hardware, or a combination of hardware and software, in one or more embodiments. Components may be implemented using hardware or a combination of hardware or software detailed above in connection with FIGS. 1A-1B. For instance, these elements or entities can include any application, program, library, script, task, service, process or any type and form of executable instructions executing on hardware of a device. The hardware includes circuitry such as one or more processors in one or more embodiments.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

It will be further understood that various changes in the details, materials, and arrangements of the parts that have been described and illustrated herein may be made by those skilled in the art without departing from the scope of the following claims.

What is claimed is:

1. A method of adjusting a number of packet engines executing on a device, comprising:
   determining, by a device executing a first plurality of packet engines to process network traffic between one or more client devices and one or more servers over a first plurality of connections, to adjust a number of packet engines executing on the device;
   activating, by the device responsive to the determining to adjust the number of packet engines, a second plurality of packet engines on the device to process network traffic of a second plurality of connections different from the first plurality of connections, the second plurality of packet engines different from the first plurality of packet engines;
   mirroring, by the device, the network traffic of the first plurality of connections and the network traffic of the second plurality of connections to both the first plurality of packet engines and the second plurality of packet engines, the second plurality of packet engines configured to reject processing the network traffic of the first plurality of connections, and the first plurality of packet engines configured to reject processing the network traffic of the second plurality of connections; and
   deactivating, by the device responsive to a timeout of the first plurality of connections, the first plurality of packet engines to cause the second plurality of packet engines to process subsequent network traffic received by the device.

2. The method of claim 1, comprising:
   identifying, by the device, a resource utilization metric associated with the first plurality of packet engines processing the network traffic between over the first plurality of connections;
   determining, by the device, to reduce the number of packet engines based on the resource utilization metric being less than a threshold; and
   activating, by the device, the second plurality of packet engines having fewer packet engines relative to the first plurality of packet engines.

3. The method of claim 1, comprising:
   identifying, by the device, a resource utilization metric associated with the first plurality of packet engines processing the network traffic between over the first plurality of connections;
   determining, by the device, to increase the number of packet engines based on the resource utilization metric being greater than or equal to a threshold; and
   activating, by the device, the second plurality of packet engines having more packet engines relative to the first plurality of packet engines.

4. The method of claim 1, comprising:
transferring, by the first plurality of packet engines to the second plurality of packet engines, connection information associated with each of the first plurality of connections; and
indicating, by the second plurality of packet engines to the first plurality of packet engines responsive to completion of the transferring, that the second plurality of packet engines have entered a primary mode and the first plurality of packet engines have entered a secondary mode.

5. The method of claim 1, comprising:
establishing, by the second plurality of packet engines responsive to activation, a shared region of memory on the device that is accessible to both the first plurality of packet engines and the second plurality of packet engines, the device comprising: i) a first region of memory accessible to the first plurality of packet engines and inaccessible to the second plurality of packet engines, and ii) a second region of memory accessible to the second plurality of packet engines and inaccessible to the first plurality of packet engines.

6. The method of claim 5, comprising:
detecting, by the first plurality of packet engines, the establishing of the shared region of memory by the second plurality of packet engines; and
responsive to the detecting, providing, by the first plurality of packet engines to the second plurality of packet engines via the shared region of memory, connection information associated with each of the first plurality of connections, the connection information comprising an internet protocol ("IP") address, port information, and idle timeout configuration.

7. The method of claim 1, comprising:
receiving, by the second plurality of packet engines, one or more packets of the network traffic corresponding to the first plurality of connections mirrored by the device;
determining, by the second plurality of packet engines, that the one or more packets correspond to the first plurality of connections; and
rejecting, by the second plurality of packet engines responsive to the determining that the one or more packets correspond to the first plurality of connections, processing of the one or more packets.

8. The method of claim 1, comprising:
receiving, by the first plurality of packet engines, one or more packets of the network traffic corresponding to the second plurality of connections mirrored by the device;
determining, by the first plurality of packet engines, that the one or more packets correspond to the second plurality of connections; and
rejecting, by the first plurality of packet engines responsive to the determining that the one or more packets correspond to the second plurality of connections, processing of the one or more packets.

9. The method of claim 1, comprising:
receiving, by the second plurality of packet engines, connection information corresponding to a connection of the first plurality of connections;
establishing, by the second plurality of packet engines, a temporary connection corresponding to the connection based on the connection information;
terminating, by the device, the connection based on a timeout of the connection;
deactivating, by the device responsive to the terminating of the connection, a packet engine of the first plurality of packet engines that processed network traffic received over the connection;
receiving, by the second plurality of packet engines, an indication of the terminating of the connection; and
clearing, by the second plurality of packet engines, the temporary connection responsive to the indication of the terminating of the connection.

10. A system to adjust a number of packet engines that execute on a device, comprising:
a device comprising one or more processors and memory;
a first plurality of packet engines of the device to process network traffic between one or more client devices and one or more servers over a first plurality of connections;
the device to:
determine to adjust a number of packet engines that execute on the device;
activate, responsive to the determination to adjust the number of packet engines, a second plurality of packet engines on the device to process network traffic of a second plurality of connections different from the first plurality of connections, the second plurality of packet engines different from the first plurality of packet engines;
mirror the network traffic of the first plurality of connections and the network traffic of the second plurality of connections to both the first plurality of packet engines and the second plurality of packet engines, the second plurality of packet engines configured to reject processing the network traffic of the first plurality of connections, and the first plurality of packet engines configured to reject processing the network traffic of the second plurality of connections; and
deactivate, responsive to a timeout of the first plurality of connections, the first plurality of packet engines to cause the second plurality of packet engines to process subsequent network traffic received by the device.

11. The system of claim 10, wherein the device is further configured to:
identify a resource utilization metric associated with the first plurality of packet engines processing the network traffic between over the first plurality of connections;
determine to reduce the number of packet engines based on the resource utilization metric being less than a threshold; and
activate the second plurality of packet engines having fewer packet engines relative to the first plurality of packet engines.

12. The system of claim 10, wherein the device is further configured to:
identify a resource utilization metric associated with the first plurality of packet engines processing the network traffic between over the first plurality of connections;
determine to increase the number of packet engines based on the resource utilization metric being greater than or equal to a threshold; and
activate the second plurality of packet engines having more packet engines relative to the first plurality of packet engines.

13. The system of claim 10, wherein:
the first plurality of packet engines are configured to transfer, to the second plurality of packet engines, connection information associated with each of the first plurality of connections; and the second plurality of packet engines are further configured to indicate to the first plurality of packet engines, responsive to completion of the transfer, that the second plurality of packet engines have entered a primary mode and the first plurality of packet engines have entered a secondary mode.

14. The system of claim 10, wherein the second plurality of packet engines are further configured to:
   establish, responsive to activation, a shared region of memory on the device that is accessible to both the first plurality of packet engines and the second plurality of packet engines, the device comprising: i) a first region of memory accessible to the first plurality of packet engines and inaccessible to the second plurality of packet engines, and ii) a second region of memory accessible to the second plurality of packet engines and inaccessible to the first plurality of packet engines.

15. The system of claim 14, wherein the first plurality of packet engines are further configured to:
   detect the establishing of the shared region of memory by the second plurality of packet engines; and
   responsive to the detection, provide, to the second plurality of packet engines via the shared region of memory, connection information associated with each of the first plurality of connections, the connection information comprising an internet protocol ("IP") address, port information, and idle timeout configuration.

16. The system of claim 10, wherein the second plurality of packet engines are further configured to:
   receive one or more packets of the network traffic corresponding to the first plurality of connections mirrored by the device;
   determine that the one or more packets correspond to the first plurality of connections; and
   reject, responsive to the determining that the one or more packets correspond to the first plurality of connections, processing of the one or more packets.

17. The system of claim 10, wherein the first plurality of packet engines are further configured to:
   receive one or more packets of the network traffic corresponding to the second plurality of connections mirrored by the device;
   determine that the one or more packets correspond to the second plurality of connections; and
   reject, responsive to the determining that the one or more packets correspond to the second plurality of connections, processing of the one or more packets.

18. The system of claim 10, wherein:
   the second plurality of packet engines are further configured to:
      receive connection information corresponding to a connection of the first plurality of connections;
      establish a temporary connection corresponding to the connection based on the connection information;
   the first plurality of packet engines are further configured to:
      terminate the connection based on a timeout of the connection;
      deactivate, responsive to the termination of the connection, a packet engine of the first plurality of packet engines that processed network traffic received over the connection;
   the second plurality of packet engines are further configured to:
      receive an indication of the terminating of the connection; and
      clear the temporary connection responsive to the indication of the terminating of the connection.

19. A non-transitory computer-readable medium storing instructions that, when executed by one or more processors, cause the one or more processors to:
   determine to adjust a number of packet engines processing network traffic between one or more clients and one or more servers;
   activate, responsive to the determination to adjust the number of packet engines, a new set of packet engines in addition to a current set of packet engines previously activated to process the network traffic, the new set of packet engines receiving connection information from the current set of packet engines via a shared region of memory to establish temporary connections corresponding to the connection information;
   mirror network traffic to both the current set of packet engines and the new set of packet engines to cause the new set of packet engines to reject packets associated with connections established by the current set of packet engines and process packets associated with new connections established by the new set of packet engines; and
   deactivate, responsive to a timeout of the connections established by the current set of packet engines to result in the new set of packet engines becoming a primary set of packet engines to process network traffic.

20. The non-transitory computer-readable medium of claim 19, further comprising instructions to:
   measure a resource utilization metric associated with the current set of packet engines; and
   determine to increase the number of packet engines based on the resource utilization metric; and
   activate the new plurality of packet engines having more packet engines than the current set of packet engines.

* * * * *